(12) United States Patent
Elliott (10) Patent No.: US 8,348,041 B2
(45) Date of Patent: Jan. 8, 2013

(54) DOG-TOOTH-FACE INTERFACE

(75) Inventor: Matthew T. Elliott, Shippenburg, PA (US)

(73) Assignee: Mack Trucks, Inc., Greensboro, NC (US)

( * ) Notice: Subject to any disclaimer, the term of this patent is extended or adjusted under 35 U.S.C. 154(b) by 711 days.

(21) Appl. No.: 11/989,040

(22) PCT Filed: Jul. 20, 2005

(86) PCT No.: PCT/US2005/025695
§ 371 (c)(1),
(2), (4) Date: Feb. 17, 2010

(87) PCT Pub. No.: WO2007/018485
PCT Pub. Date: Feb. 15, 2007

(65) Prior Publication Data
US 2010/0140042 A1 Jun. 10, 2010

(51) Int. Cl.
*F16D 11/14* (2006.01)
(52) U.S. Cl. .............. 192/69.71; 192/69.7; 192/108; 29/401.1
(58) Field of Classification Search ............. 192/69.7, 192/69.71, 108
See application file for complete search history.

(56) References Cited

U.S. PATENT DOCUMENTS

| | | | | | |
|---|---|---|---|---|---|
| 294,672 | A | * | 3/1884 | Proctor et al. | 192/48.5 |
| 1,220,320 | A | * | 3/1917 | Conwell | 192/69.71 |
| 1,994,773 | A | * | 3/1935 | Lapsley | 74/333 |
| 2,558,203 | A | * | 6/1951 | Wildhaber | 192/108 |
| 4,280,583 | A | * | 7/1981 | Stieg | 180/250 |
| 5,524,738 | A | * | 6/1996 | Erlebach et al. | 192/69.83 |
| 6,354,417 | B1 | * | 3/2002 | Narita et al. | 192/69.71 |

* cited by examiner

*Primary Examiner* — Richard M. Lorence
(74) *Attorney, Agent, or Firm* — Martin Farrell; Michael Pruden (57) ABSTRACT

A dog-tooth-face interface for a vehicle includes a first clutch element that has a plurality of recesses distributed on a side of the first clutch element and around an axis through the first clutch element and a second clutch element that has a plurality of teeth configured to engage with the recesses and distributed on a side of the second clutch element adjacent the recesses. At least one of the first clutch element and the second clutch element is configured so as to rotate about the axis, and at least one of the first clutch element and second clutch element is configured so as to move along the axis to engage or disengage the first and second clutch elements. Moreover, the first clutch element has a substantially continuous wall surrounding the recesses, and the recesses have at least one corner relief portion configured to avoid contact with corners of the teeth.

17 Claims, 6 Drawing Sheets

DOG-TOOTH-FACE INTERFACE

INTRODUCTION

The present invention relates to vehicle parts and components, and the preferred embodiments relate to, e.g., systems and methods for providing an interface or clutch within vehicles, such as, most particularly, trucks or commercial vehicles. In the preferred embodiments, a novel dog-tooth-face interface is provided having substantial advantages over existing structures.

BACKGROUND

A variety of mechanical interfaces, such as clutches, couplings, differential mechanisms and/or the like are known. In the context of automotive vehicles, such as, e.g., motorcycles, automobiles, trucks, busses and the like, mechanical interfaces are often employed within drive trains or the like, such as, e.g., in the transmission of power from an engine to one or more vehicle drive wheels. By way of example, some mechanical interfaces, known as differential gear interfaces, are employed within vehicles so as to provide a balanced power distribution during operation of a vehicle. In this regard, during vehicle turning, gears may be enabled by such differential gear interfaces to rotate relative to one another (i.e., differentially), allowing higher rotational speeds of outer drive wheels.

Figure 1:
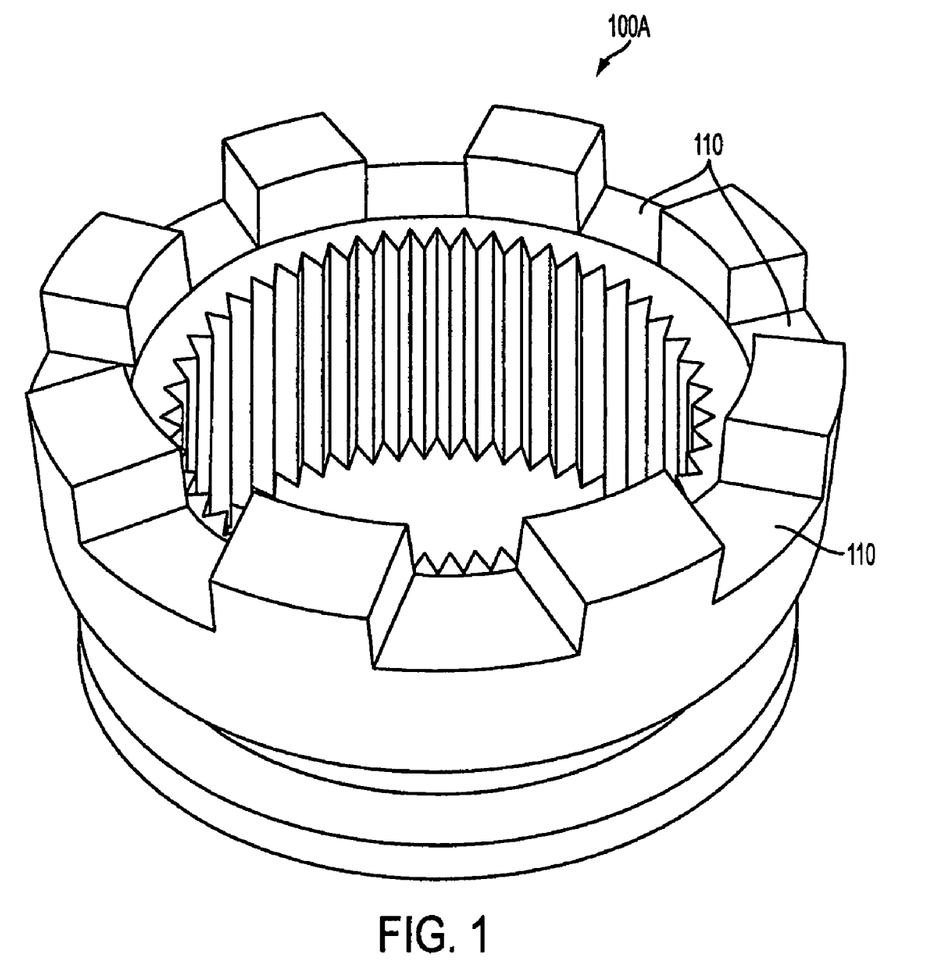
FIG. 1 is a perspective view of one element of a clutch according to a background clutch design.

By way of example, in some existing vehicles, clutch members include teeth that are moved into and out of engagement during operation of the clutch. In this regard, FIG. 1 shows an illustrative clutch element 100A having clutch recesses 110 that operate in conjunction with another clutch element (not shown) having corresponding clutch teeth (not shown) that engage within the clutch recesses 110.

While a variety of interfaces and clutch designs are known, existing interfaces and clutch designs have notable limitations. For example, in some vehicle applications, such as in certain environments involving large commercial vehicles, including trucks and other commercial vehicles, previous designs were incapable of sufficiently handling stresses imparted to a clutch set in a limited space that was available for the clutch set.

In an effort to establish desirable clutch structures for vehicles, some existing clutches have employed a splined clutch set. However, such splined clutch sets have a number of disadvantages. For example, such splined clutch sets typically rely on having a long engagement depth and typically require that the splines be machined into the clutch parts. Among other disadvantages, these requirements have typically limited that technology to applications with larger working areas.

In addition, a variety of other systems and devices are also known. By way of example, additional background documents include:
a) U.S. Pat. No. 6,551,209, which shows an "electrically actuated locking differential" of the "type in which the differential gearing may be locked in response to an electrical input signal;"
b) U.S. Pat. No. 5,816,971, which shows "a locking differential" "for selectably locking a first axle to a second axle;" and
c) U.S. Pat. No. 1,579,728, which shows a "synchronizer" for "use in situations where . . . clutches or gears are moved relative to each other along the same axis of rotation."

Although a variety of systems and methods are known, there is a continued need to improve these and other existing systems and/or to overcome limitations therein. As set forth below, the preferred embodiments of the present invention provide notable advancements over the systems and methods described in the above-noted documents as well as other existing systems and devices.

SUMMARY

The preferred embodiments of the invention can substantially improve upon existing systems and methods.

According to some illustrative examples, a dog-tooth-face interface for a vehicle is provided that includes a first clutch element that has a plurality of recesses distributed on a side of the first clutch element and around an axis through the first clutch element and a second clutch element that has a plurality of teeth configured to engage with the recesses and distributed on a side of the second clutch element adjacent the recesses. In addition, at least one of the first clutch element and the second clutch element is configured so as to rotate about the axis, and at least one of the first clutch element and second clutch element is configured so as to move along the axis to engage or disengage the first and second clutch elements. Moreover, the first clutch element has a substantially continuous wall surrounding the recesses, and the recesses have at least one corner relief portion configured to avoid contact with corners of the teeth. In some examples, the substantially continuous wall is a substantially continuous outer wall that has inner surfaces delineating outermost sides of the recesses, wherein the surfaces are generally parallel to the axis and extend substantially an entire depth of the recesses. In addition, in some examples, the first clutch element includes openings on an inner side of the recesses through which the teeth extend radially inward in a direction towards the axis past an engagement with the first clutch element for increased bending strength of the teeth. In addition, in some examples, the first clutch element includes a substantially continuous inner wall surrounding the recesses.

In some examples, among various potential benefits, one or more of the following advantages can be achieved. First, in some examples, the working envelope of a mechanical interface (e.g., clutch set) can be downsized. Second, in some examples, members of a clutch set can be net forged so as to eliminate machining, such that the cost of the clutch set can be significantly less than as compared to a cut spline clutch set.

Examples of the present invention can be used in a variety of contexts or applications. In some cases, examples of the present invention can be advantageously employed within two notable applications. First, examples of the present invention can be implemented are in differential locks and transfer cases, such as, e.g., within trucks or other vehicles. Second, examples of the present invention can be employed within Sequential Shift Gearboxes, such as, e.g., within trucks or other vehicles. In addition, the various examples of the invention can be implemented within a variety of other applications. Among other things, the load handling capabilities and robustness of the preferred designs can facilitate handling various cycling and/or impact loading in some applications. Moreover, the compact size enabled by examples of the present invention is advantageous in various compact environments, such as, e.g., for automobile applications, motorcycle applications or other applications involving compact sizes.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which like reference numerals indicate like or similar parts, and in which.

DETAILED DESCRIPTION

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

1. General

The preferred examples of the invention provide a design that meets the desired fatigue strengths for certain vehicle tooth geometry interfaces, such as, for example, in a differential locks application within certain trucks or commercial vehicles. For example, in certain trucks of the present assignee, it was found that prior differential lock designs fell short of the desired fatigue strengths due to a lack of space available for a larger clutch set in such vehicles.

A first type of failure was because within the available area it was difficult to design two mating parts of a clutch to experience equal stress. In some examples, where a clutch design included clutch teeth that meshed with teeth on a differential half, biasing of material from the clutch to the differential half was relatively unsuccessful due to the backlash that was required in the system for quick engagement. This backlash would cause hard contact in the outer corners of the clutch teeth under heavy loading due to deflection. When the teeth in the differential half were reduced in size to allow material to be biased to the clutch teeth and improve their bending strength, the teeth on the differential half would fatigue at almost the same load the clutch did in the previous test.

Accordingly, material could not be removed from the differential teeth while still reaching the desired bending strength. On the other hand, the diameter of the clutch face could not be increased due to packaging constraints.

According to some examples of the invention, the forgoing issues are addressed by a) eliminating corner contact under load and b) biasing material toward an outer or inner rim. In some examples, it was found that this new design resulted in about a 30% increase or more in bending strength of the clutch set.

2. Illustrative Examples

FIGS. 2 to 8 show some illustrative examples of the present invention. First, with reference to FIGS. 6 and 7, in some illustrative embodiments a mechanical interface 300, such as, e.g., a clutch, is provided that includes two clutch elements: a first clutch element 300A and a second clutch element 300B. In these examples, the first clutch element 300A is formed in some non-limiting examples as an annular member (shown in cross-section across a diameter thereof in FIGS. 6 and 7) having a plurality of tooth-engaging recesses 300AO formed therein. On the other hand, the second clutch element 300B is in some non-limiting examples formed as a generally cylindrical member having a plurality of teeth 300BT protruding from locations around the periphery thereof in such a manner as to be engaged with and disengaged with respective ones of the recesses 300AO.

Figure 6:
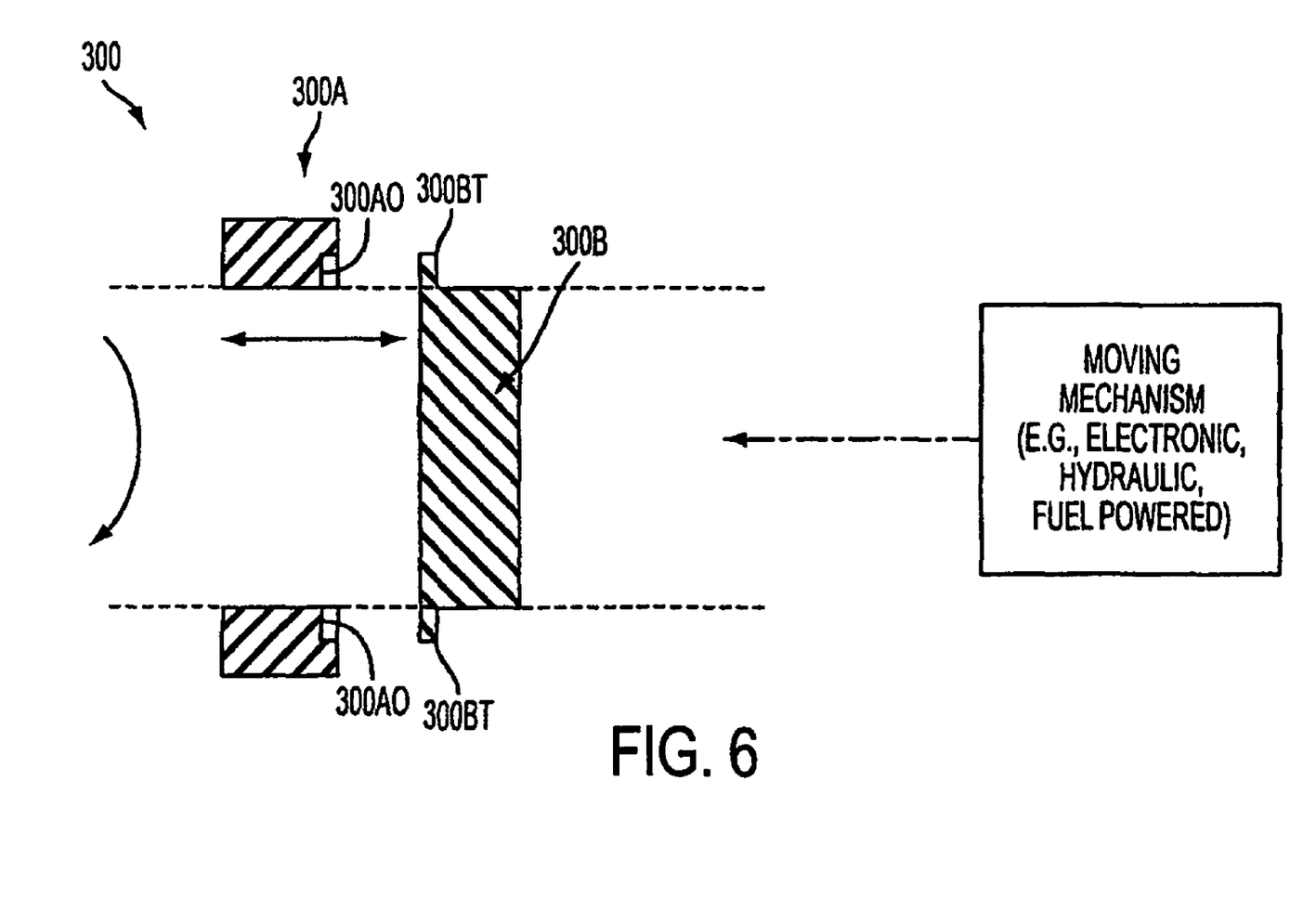
FIG. 6 is a cross-sectional side view showing a clutch or interface having a first clutch element with teeth and a second clutch element with recesses configured to engage said teeth.
Figures 7, 8:
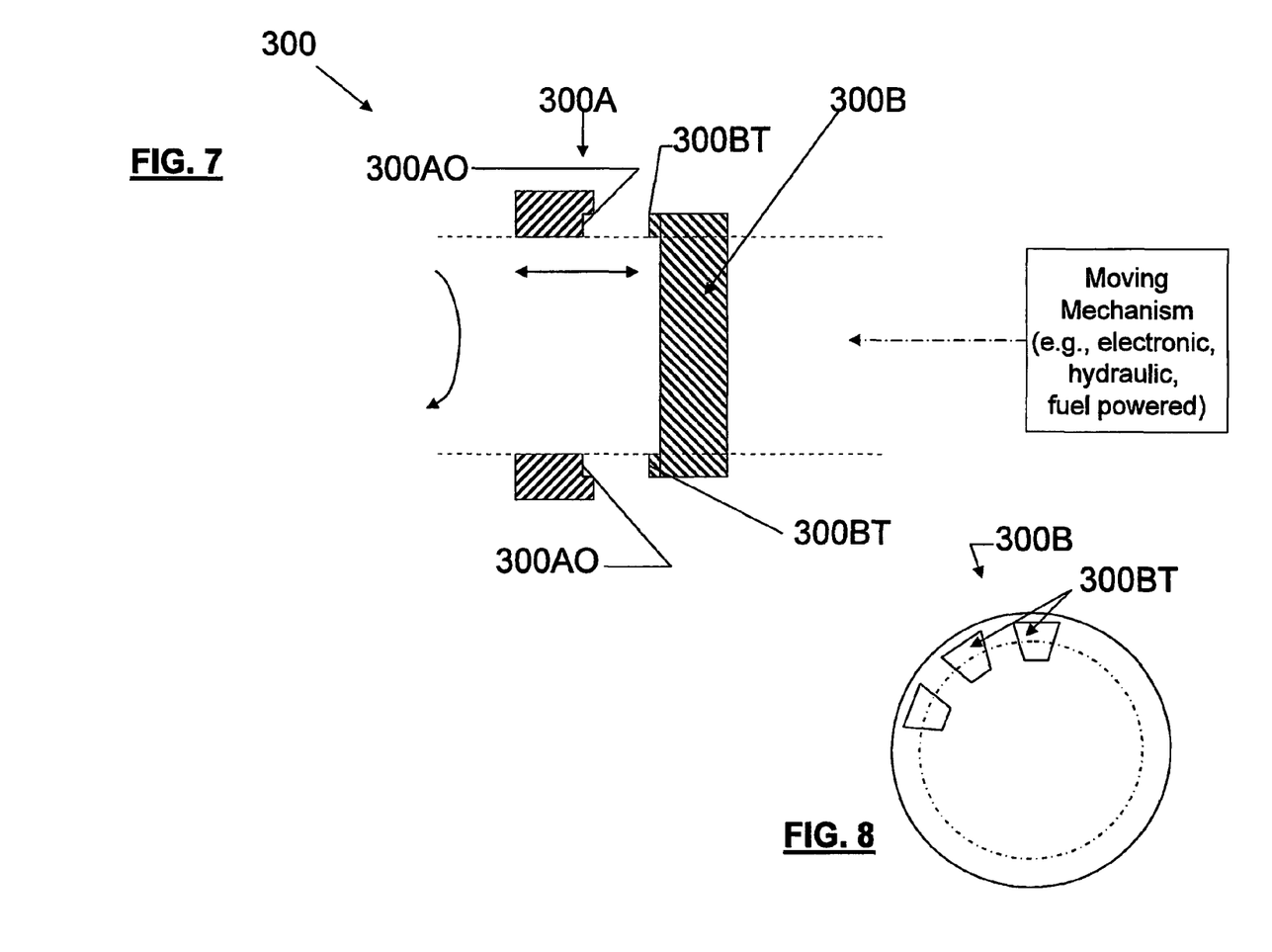
FIG. 7 is a cross-sectional side view showing another clutch or interface having a first clutch element with teeth and a second clutch element with recesses configured to engage said teeth.
FIG. 8 is an end view of the first clutch element shown in FIG. 7.

Although the first and second clutch elements can vary in structure and configuration depending on circumstances, FIG. 6 shows one illustrative example in which the teeth 300BT extend outward in a radial direction and FIG. 7 shows another illustrative example in which the teeth 300BT extend in an axial direction (e.g., in the direction of the double-ended arrow shown in FIGS. 6 and 7).

As also shown in FIGS. 6 and 7, a moving mechanism is preferably employed that moves one or more of the elements 300A and 300B with respect to one another in the direction of the double-ended arrow shown in these figures such that the teeth 300BT can be brought into and out of engagement with the recesses 300AO to engage or disengage the interface or clutch.

In various embodiments, the moving mechanism can employ any desired or appropriate form of motive force, such as, e.g., a manually-powered drive, an electrically-powered drive, an hydraulically-powered drive, a fuel-powered drive, a solar-powered drive and/or the like, and can employ any appropriate mechanism to facilitate proper motion of the respective elements, such as, e.g., employing spline shafts for ensuring that the elements follow a specific path, and, preferably, a specific reciprocating path in a generally linear direction (such as, e.g., shown by way of dashed lines in the example shown in FIGS. 6 and 7).

In various embodiments, the clutch elements 300A and 300B and the moving mechanism(s) can be adapted as desired to meet the particular circumstances at hand. By way of example, in some illustrative embodiments, these elements and mechanisms can be adapted so as to be applied within one or more of the following environments: a) a differential gearing structure similar to that shown in U.S. Pat. No. 6,551,209 (such as, e.g., modifying teeth 39 and recesses 43 with tooth and recess structure as described herein); b) the locking differential shown in U.S. Pat. No. 5,816,971; and c) the synchronizer gears shown in U.S. Pat. No. 1,579,728 (such as, e.g., modifying projections 25 and recesses 24 with tooth and recess structure as described herein). All of these three patents are incorporated by reference in their entireties as though recited herein in full.

The preferred embodiments of the invention employ an improved clutch teeth and recess engagement structure having substantial advantages over existing systems and devices.

Figure 4:
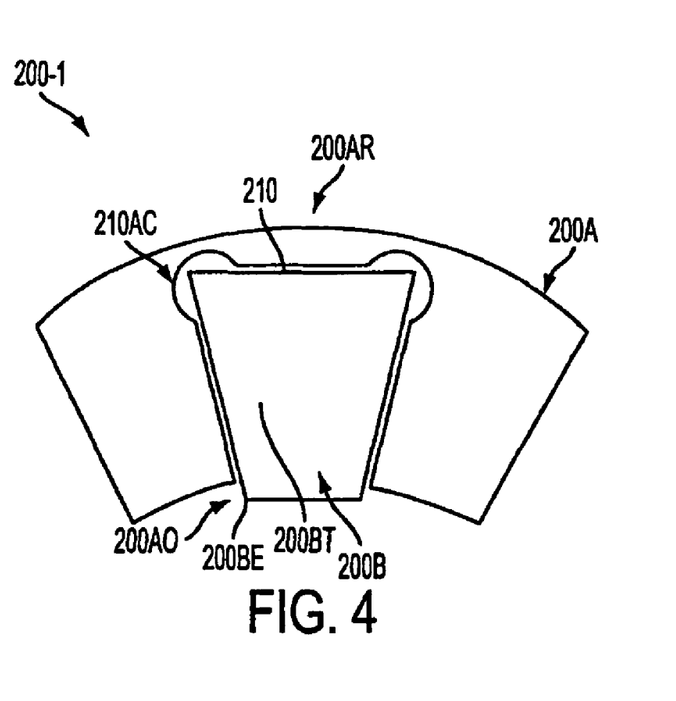
FIG. 4 is a partial cross-sectional side view showing an interface between a recess within a portion of the element of the clutch shown in FIG. 2 and a tooth of another clutch element engaged with that recess.

In this regard, FIG. 4 shows a frontal cross-section view of an engagement of an illustrative mechanical interface or clutch set 200-1. In this illustrative example, a flank-only contact is employed which inhibits the highest stress risers from the system under both drive and coastal conditions of a vehicle. As shown, material is added to the narrow side of the tooth (i.e., the tooth is formed so as to extend at extended portion 200BE past the engagement with the element 200A for increased bending strength) and the outer rim of the clutch includes a continuous outer rim 200AR. In this manner, the bending strength of both members 200A and 200B can be increased.

Among other things, the tooth geometries shown in FIG. 4 can optimize the strength of a dog tooth clutch design in a confined area. In the preferred embodiments, as described above, the outer wall 200AR is provided in the member 200A. Preferably, this outer wall 200AR is a continuous annular wall around outside perimeter of the member 200A. Among other things, the continuous annular wall around the outside perimeter of the clutch can help to increase the strength of the clutch teeth. Among other things, this allows for the clutch element 200A and the mating part 200B to be designed for equal stress by biasing material from the stronger of these two parts to the weaker of these two parts.

With reference to FIG. 4, as described above, in some preferred embodiments, the teeth 200BT preferably extend past an inner surface of the member 200A such that a portion 200BE of each tooth 200BT extends past and does not engage with the member 200A. Among other things, this structure can achieve a flank-only contact with the member 200A that removes or inhibits the highest stress risers from the system under both drive and coast conditions. In addition, as described above, the material added to the narrow side of the tooth 200BT and to the outer wall 200AR advantageously increases the bending strengths of each of the members 200A and 200B, respectively.

In addition, in the preferred embodiments, at least one cut-away corner-relief region 200AC is provided at one or more of the corners of the interface as shown in FIGS. 2-5. These corner-relief regions are preferably rounded; in some embodiments, the corner-relief regions will have a generally constant radius of curvature (such as, e.g., shown at 210AC in FIG. 4), while in other embodiments, the corner-relief regions can have a non-constant radius of curvature. Among other things, the corner-relief regions are preferably configured so as to prevent corner contact between a corner of the tooth 200BT and the element 200A during engagement, disengagement and operation of the clutch. By preventing corner contact been the parts 200A and 200B, an optimized flank contact area, free of stress risers can be achieved.

Figure 5:
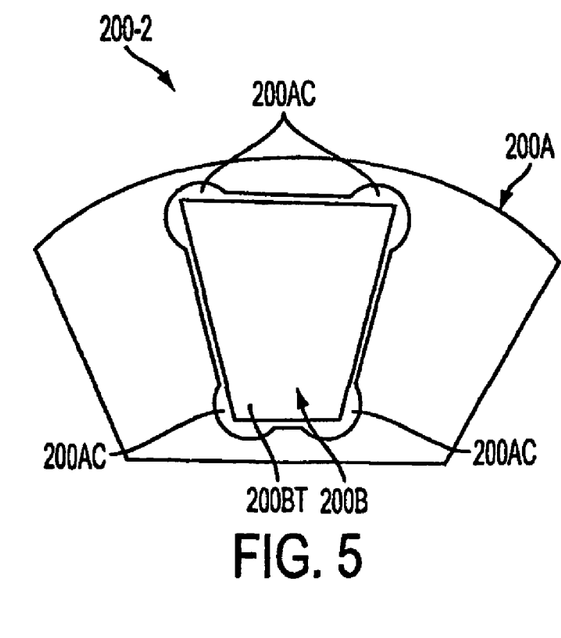
FIG. 5 is a partial cross-sectional side view showing an interface between a recess within a portion of a modified clutch element and a tooth of another clutch element engaged with that recess.

In some preferred and non-limiting examples, the recesses 200A0 are configured so as to have a tapered cross-section as shown in FIGS. 4 and 5. In addition, in some preferred examples, the recesses are configured so as to have a cross-section similar to an isosceles trapezoid as shown in FIGS. 4 and 5. Similarly, in some preferred and non-limiting examples, the teeth 200BT are configured so as to have a tapered cross-section as shown in FIGS. 4 and 5. In addition, in some preferred examples, the teeth are configured so as to have a cross-section similar to an isosceles trapezoid as shown in FIGS. 4 and 5.

In some exemplary and non-limiting embodiments, the recesses and the teeth are configured so as to have a cross-sectional shape substantially the same as that shown in one or more of FIGS. 2 through 5, with such figures showing some illustrative embodiments depicted substantially in appropriate proportions. In addition, in some illustrative examples, a clutch can include eight recesses and eight teeth on the respective clutch parts, such as shown in FIGS. 2-5. However, the number of recesses and teeth can vary depending on circumstances, and, by way of example, can include between about half the number of such recesses and teeth (or even less) to about twice the number of such recesses and teeth (or even more).

With reference to FIGS. 6 and 7, one or more of the parts 200A and 200B are preferably moved (e.g., slid) towards and away from one another during operation. Depending on circumstances, the geometry as shown in FIGS. 2-3 can be used on a moving (e.g., sliding) part of the clutch or on a non-moving (e.g., stationary) part of the clutch.

Figure 2:
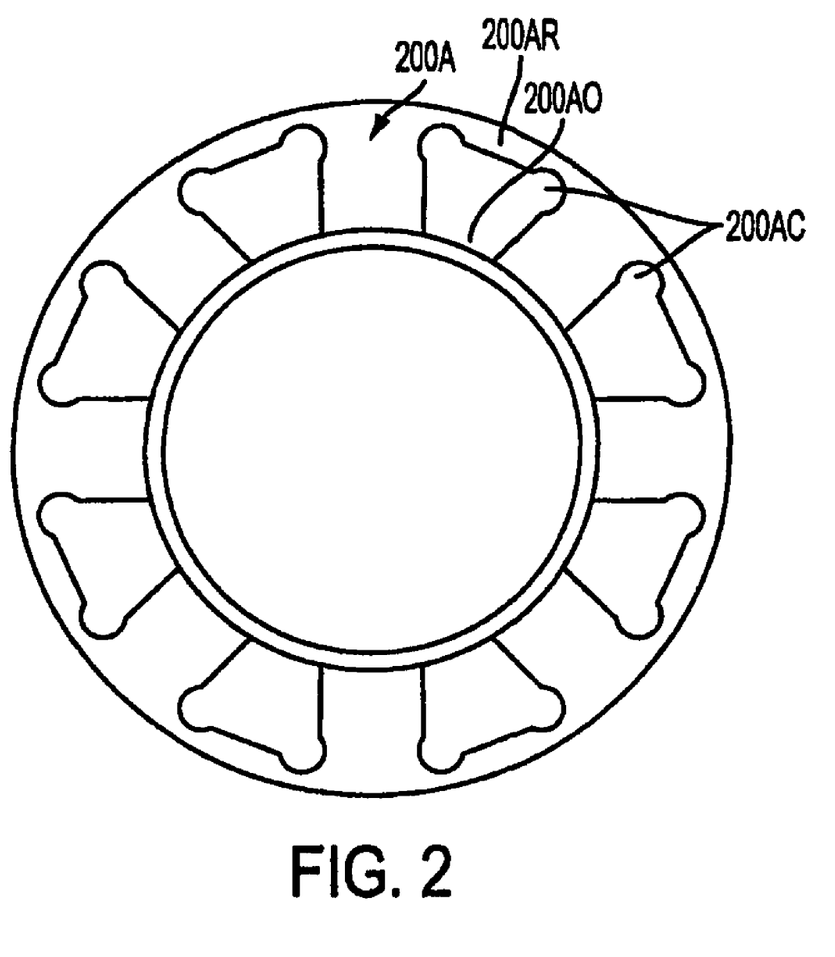
FIG. 2 is an end view of one element of a clutch according to some embodiments of the invention.
Figure 3:
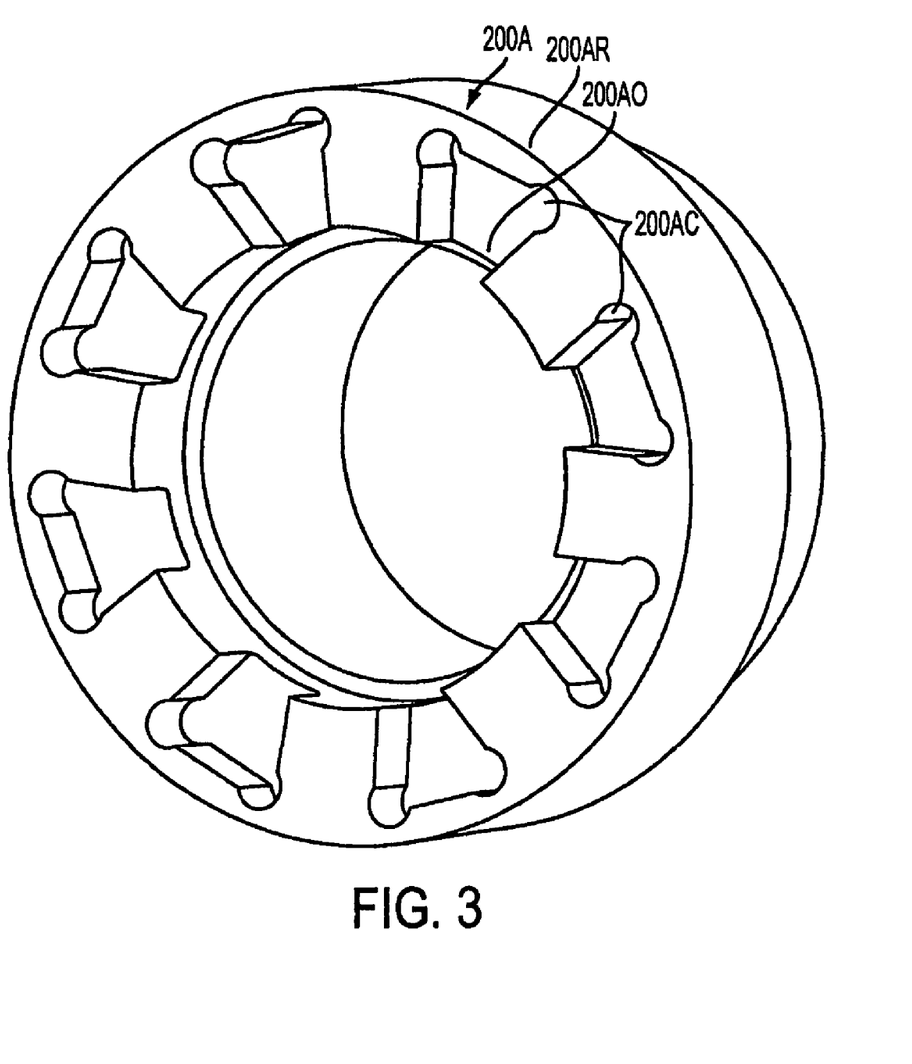
FIG. 3 is a perspective view of the end of the element of the clutch shown in FIG. 2.

In some other examples, the part 200A shown in FIGS. 2-3 can be modified such that a continuous annular wall 200AR is alternatively or additionally formed around an inside radius (e.g., a minor diameter) of the part 200A. In some embodiments, if space is not available or appropriate around an outside diameter, a continuous wall can be provided solely around an inside radius. By way of example, FIG. 5 shows an illustrative mechanical interface or clutch set 200-2 which employs both a continuous outer wall and a continuous inner wall. In this regard, in such an embodiment, the recesses formed in the member 200A preferably include corner relief portions 200AC at each of the inside and outside corners of the interface. In this illustrative example, an outer perimeter end 210 (shown in FIG. 4) of the tooth 200BT is, thus, located internally to the wall 200AR.

3. Illustrative Advantages and Applications

In some examples, among various potential benefits, one or more of the following advantages can be achieved. First, the working envelope of the mechanical interface (e.g., clutch set) can be downsized. Second, both members of a clutch set can be net forged so as to eliminate machining, such that the cost of the clutch set can be significantly less than as compared to a cut spline clutch set.

Examples of the present invention can be used in a variety of contexts or applications. In some cases, examples of the present invention can be employed within two notable applications.

First, some illustrative applications in which examples of the present invention can be implemented are in differential locks and transfer cases, such as, e.g., within trucks or other vehicles. In some examples, because of the compact size of the preferred examples of the invention, examples of the invention can be readily implemented in retrofit applications of existing differential locks and transfer case designs, such as, for example, to retrofit existing devices with a locking feature that did not previously fit within the housing area. Among other things, the load handling capabilities of the preferred examples make it an excellent fit in a final drive application.

Second, another illustrative application where examples of the present invention could be of value is in Sequential Shift Gearboxes, such as, e.g., within trucks or other vehicles. In view of the numbers of cycles and the engagement harshness that can be associated with sequential transmissions, examples of the present invention can provide significant advantages in such applications. Among other things, the load handling capabilities and robustness of the design can handle the cycling and impact loading that these transmissions can create. In addition, the compact size would also make examples of the present invention advantageous in compact environments, such as, e.g., for making a compact sequential gearbox for automobile applications, motorcycle applications or other applications involving compact sizes.

In various other implementations, examples of the present invention can be employed within any other appropriate mechanical interface application that may benefit by one or more advantages of the present invention, as would be apparent to those of ordinary skill in the art based on the present disclosure.

4. Broad Scope of the Invention

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. A dog-tooth-face interface for a vehicle, comprising:
   a first clutch element having a plurality of recesses distributed on a side of the first clutch element and around an axis through said first clutch element;
   a second clutch element having a plurality of teeth configured to engage with said recesses and distributed on a side of the second clutch element adjacent said recesses;
   at least one of said first clutch element and said second clutch element being configured so as to rotate about said axis and at least one of said first clutch element and second clutch element being configured so as to move along said axis to engage or disengage said first and second clutch elements; and
   said first clutch element having a substantially continuous wall surrounding said recesses, and said recesses further having at least one corner relief portion configured to avoid contact with corners of said teeth;
   said first clutch element includes openings on an inner side of said recesses through which said teeth can, when engaged with said recesses, extend radially inward in a direction towards said axis past an engagement with said first clutch element for increased bending strength of said teeth.

2. The dog-tooth-face interface of claim 1, wherein said recesses have a generally tapered cross-sectional shape.

3. The dog-tooth-face interface of claim 1, wherein said substantially continuous wall is a substantially continuous outer wall that has inner surfaces delineating outermost sides of said recesses, wherein said surfaces are generally parallel to said axis and extend substantially an entire depth of said recesses.

4. The dog-tooth-face interface of claim 3, wherein said recesses have a generally constant depth.

5. The dog-tooth-face interface of claim 1, wherein said teeth have a substantially trapezoidal cross-sectional shape.

6. The dog-tooth-face interface of claim 5, wherein said cross-sectional shape is substantially that of an isosceles trapezoid.

7. An assembly including the dog-tooth-face interface of claim 1, wherein said dog-tooth-face interface is part of a differential lock.

8. The assembly of claim 7, wherein said differential lock is configured to transmit power from a vehicle engine to one or more vehicle drive wheels in such a manner as provide a balanced power distribution during operation of the vehicle.

9. The assembly of claim 7, wherein said differential lock is mounted within a truck.

10. An assembly including the dog-tooth-face interface of claim 1, wherein said dog-tooth-face interface is part of a sequential shift gearbox.

11. The assembly of claim 10, wherein said sequential shift gearbox is mounted within a truck.

12. A method of providing an increased strength dog-tooth-face interface for a vehicle, comprising:
   providing a first clutch element having a plurality of recesses distributed on a side of the first clutch element around an axis through said first clutch element;
   providing a second clutch element having a plurality of teeth configured to engage with said recesses and distributed on a side of the second clutch element adjacent said recesses;
   providing at least one of said first clutch element and said second clutch element configured so as to rotate about said axis and at least one of said first clutch element and second clutch element being configured so as to move along said axis to engage or disengage said first and second clutch elements; awl
   providing said first clutch element with a substantially continuous outer wall surrounding said recesses, and providing said recesses with at least one corner relief portion configured to avoid contact with corners of said teeth; and,
   providing said first clutch element with openings on an inner side of said recesses through which said teeth when engaged with said recesses extend radially inward in a direction towards said axis past an engagement with said first element for increased bending strength of said teeth.

13. The method of claim 12, wherein said method increases the strength of a differential lock of a vehicle.

14. The method of claim 12, wherein said method increases the strength of a sequential shift gear box of a vehicle.

15. A method of providing an increased strength dog-tooth-face interface for a vehicle, comprising:
   providing a first clutch element having a plurality of recesses distributed on a side of the first clutch element around an axis through said first clutch element;
   providing a second clutch element having a plurality of teeth configured to engage with said recesses and distributed on a side of the second clutch element adjacent said recesses;
   providing at least one of said first clutch element and said second clutch element configured so as to rotate about said axis and at least one of said first clutch element and second clutch element being configured so as to move along said axis to engage or disengage said first and second clutch elements;
   providing said first clutch element with a substantially continuous wall surrounding said recesses, and providing said recesses with at least one corner relief portion configured to avoid contact with corners of said teeth; and,
   removing at least one component of a vehicle and replacing said at least one component so as to retrofit the vehicle with said dog-tooth-face interface.

16. The method of claim 15, wherein said at least one component is part of a differential lock.

17. The method of claim 15, wherein said at least one component is part of a sequential shift gearbox.

* * * * *